UNITED STATES PATENT OFFICE.

CHARLES EFROS, OF NEW YORK, N. Y., ASSIGNOR TO VINCENT P. TRAVERS, OF SAME PLACE.

LUBRICANT.

SPECIFICATION forming part of Letters Patent No. 562,291, dated June 16, 1896.

Application filed September 12, 1895. Serial No. 562,288. (No specimens.)

*To all whom it may concern:*

Be it known that I, CHARLES EFROS, a resident of the city, county, and State of New York, have invented certain new and useful Improvements in Lubricants for Hoisting and Transmission Rope and other Purposes, of which the following is a specification.

My invention relates to lubricants for hoisting and transmission rope and other purposes, and has for its object to produce a waterproof lubricant designed, mainly, for use upon cordage which is used for hoisting and transmission or other power purposes.

To this end my invention consists in the composition hereinafter set forth and claimed.

Lubricants for hoisting and transmission rope as heretofore compounded have been open to serious defects, among which have been the drying out of the lubricant, the lack of waterproofing qualities in the lubricant and the liability of the lubricant to become rancid by the action of atmospheric air thereon, thereby destroying its valuable properties. My lubricant is not open to either of these defects.

In practicing my invention I make a composition of vaseline, tar, coal-tar oil, naphthalene, paraffin and paraffin-oil, with or without the addition of plumbago. These ingredients as well as their proportions may be greatly varied, but I have found it advantageous to employ the ingredients in the following proportions, namely: two hundred and forty pounds of vaseline, ninety pounds of tar, fifty pounds of coal-tar oil, forty-five pounds of naphthalene, twenty-five pounds of paraffin, and fifteen pounds of paraffin-oil. With these ingredients I may incorporate ninety pounds of plumbago.

In making the above-described mixture I proceed as follows: In a copper-jacketed kettle I melt the paraffin with the naphthalene and then add the tar and then the tar-oil. The paraffin-oil is afterward added and then the vaseline, the whole composition being stirred while the ingredients are being put in by a mechanical mixer, so as to thoroughly incorporate the ingredients. The mixing should be done at a temperature of about 180° Fahrenheit. To this composition, if desired, I add the plumbago and thoroughly incorporate it with the remaining ingredients.

My composition may be applied to the cordage before spinning or during any other stage of the manufacture thereof or after the cordage is in its final form.

What I claim, and desire to secure by Letters Patent, is—

1. A composition for lubricating and waterproofing vegetable fiber consisting of vaseline, tar, coal-tar oil, naphthalene, paraffin, paraffin-oil and plumbago.

2. The herein-described composition for lubricating and waterproofing vegetable fiber consisting of vaseline, tar, coal-tar oil, naphthalene, paraffin and paraffin-oil in about the proportions specified.

The foregoing specification of my improvements in lubricants for hoisting and transmission rope and other purposes signed by me this 5th day of September, 1895.

CHARLES EFROS.

Witnesses:
GEORGE E. MORSE,
MAURICE BLOCK.